(12) United States Patent
Kirsch

(10) Patent No.: US 7,181,593 B2
(45) Date of Patent: *Feb. 20, 2007

(54) ACTIVE MEMORY COMMAND ENGINE AND METHOD

(75) Inventor: Graham Kirsch, Hampshire (GB)

(73) Assignee: Micron Technology, Inc., Boise, ID (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/629,428

(22) Filed: Jul. 28, 2003

(65) Prior Publication Data

US 2004/0193840 A1 Sep. 30, 2004

(30) Foreign Application Priority Data

Mar. 27, 2003 (GB) .................................. 0307085.1

(51) Int. Cl.
*G06F 15/00* (2006.01)
(52) U.S. Cl. ............................ 712/10; 712/14; 711/154
(58) Field of Classification Search ...................... None
See application file for complete search history.

(56) References Cited

U.S. PATENT DOCUMENTS

| | | | |
|---|---|---|---|
| 5,680,550 A * | 10/1997 | Kuszmaul et al. ............ | 712/11 |
| 5,987,488 A | 11/1999 | Harrand et al. ............. | 708/520 |
| 6,970,966 B2 * | 11/2005 | Gemelli et al. ............. | 710/305 |
| 2002/0073298 A1 * | 6/2002 | Geiger et al. ................ | 711/206 |
| 2003/0097389 A1 * | 5/2003 | Saulsbury et al. .......... | 708/445 |
| 2004/0148468 A1 * | 7/2004 | Hooker ........................ | 711/132 |
| 2004/0193788 A1 * | 9/2004 | Barth et al. ................. | 711/105 |
| 2004/0193839 A1 * | 9/2004 | Kirsch ........................... | 712/4 |
| 2005/0286081 A1 * | 12/2005 | Unno ......................... | 358/1.15 |

FOREIGN PATENT DOCUMENTS

| | | |
|---|---|---|
| EP | 0 438 800 A2 | 7/1991 |
| GB | 2 286 700 A | 8/1995 |
| WO | 93/14459 A1 | 7/1993 |

* cited by examiner

*Primary Examiner*—Mano Padmanabhan
*Assistant Examiner*—Kaushik Patel
(74) *Attorney, Agent, or Firm*—Dorsey & Whitney, LLP

(57) ABSTRACT

A command engine for an active memory receives high level tasks from a host and generates corresponding sets of either DCU commands to a DRAM control unit or ACU commands to a processing array control unit. The DCU commands include memory addresses, which are also generated by the command engine, and the ACU command include instruction memory addresses corresponding to an address in an array control unit where processing array instructions are stored.

91 Claims, 4 Drawing Sheets

ACTIVE MEMORY COMMAND ENGINE AND METHOD

TECHNICAL FIELD

The invention relates memory devices, and, more particularly, to a system and method for internally supplying processing element commands and memory device commands in an active memory device.

BACKGROUND OF THE INVENTION

A common computer processing task involves sequentially processing large numbers of data items, such as data corresponding to each of a large number of pixels in an array. Processing data in this manner normally requires fetching each item of data from a memory device, performing a mathematical or logical calculation on that data, and then returning the processed data to the memory device. Performing such processing tasks at high speed is greatly facilitated by a high data bandwidth between the processor and the memory devices. The data bandwidth between a processor and a memory device is proportional to the width of a data path between the processor and the memory device and the frequency at which the data are clocked between the processor and the memory device. Therefore, increasing either of these parameters will increase the data bandwidth between the processor and memory device, and hence the rate at which data can be processed.

A memory device having its own processing resource is known as an active memory. Conventional active memory devices have been provided for mainframe computers in the form of discrete memory devices provided with dedicated processing resources. However, it is now possible to fabricate a memory device, particularly a dynamic random access memory ("DRAM") device, and one or more processors on a single integrated circuit chip. Single chip active memories have several advantageous properties. First, the data path between the DRAM device and the processor can be made very wide to provide a high data bandwidth between the DRAM device and the processor. In contrast, the data path between a discrete DRAM device and a processor is normally limited by constraints on the size of external data buses. Further, because the DRAM device and the processor are on the same chip, the speed at which data can be clocked between the DRAM device and the processor can be relatively high, which also maximizes data bandwidth. The cost of an active memory fabricated on a single chip can is also less than the cost of a discrete memory device coupled to an external processor.

Although a wide data path can provide significant benefits, actually realizing these benefits requires that the processing bandwidth of the processor be high enough to keep up with the high bandwidth of the wide data path. One technique for rapidly processing data provided through a wide data path is to perform parallel processing of the data. For example, the data can be processed by a large number of processing elements ("PEs") each of which processes a respective group of the data bits. One type of parallel processor is known as a single instruction, multiple data ("SIMD") processor. In a SIMD processor, each of a large number of PEs simultaneously receive the same instructions, but they each process separate data. The instructions are generally provided to the PE's by a suitable device, such as a microprocessor. The advantages of SIMD processing are that SIMD processing has simple control, efficiently uses available data bandwidth, and requires minimal logic hardware overhead.

An active memory device can be implemented by fabricating a large number of SIMD PEs and a DRAM on a single chip, and coupling each of the PEs to respective groups of columns of the DRAM. The instructions are provided to the PEs from an external device, such as a microprocessor. The number of PE's included on the chip can be very large, thereby resulting in a massively parallel processor capable of processing vast amounts of data. However, this capability can be achieved only by providing instructions to the PEs at a rate that is fast enough to allow them to operate at their maximum speed. It can require more time to couple instructions to the PEs from an external device, such as a microprocessor, than the time required to execute the instructions. Under these circumstances, the PEs will be operating at less than their maximum processing speed.

There is therefore a need for a system and method for more rapidly providing instructions to SIMD PE's that are embedded in a DRAM.

SUMMARY OF THE INVENTION

An integrated circuit active memory device is preferably fabricated on a single semiconductor substrate. The active memory device includes a memory device coupled to an array of processing elements through a data bus having a plurality of data bus bits. Each processing elements are preferably coupled to a respective group of the data bus bits, and each of the processing elements have an instruction input coupled to receive processing element instructions for controlling the operation of the processing elements. The processing element instructions are provided by an array control unit, and memory device instructions for controlling the operation of the memory device are provided by a memory device control unit. The array control unit is coupled to the processing elements in the array, and it is operable to generate and to couple the processing element instructions to the processing elements. Each of a plurality of sets of processing element instructions are generated responsive to a respective one of a plurality; of array control unit commands applied to a command input of the array control unit. A memory control unit coupled to the memory device is operable to generate and to couple respective sets of memory commands to the memory device responsive to each of a plurality of memory control unit commands applied to a command input of the memory control unit. Respective sets of the array control unit commands and respective sets of the memory control unit commands are provided by a command engine responsive to respective task commands applied to a task command input of the command engine.

DETAILED DESCRIPTION OF THE INVENTION

Figure 1:
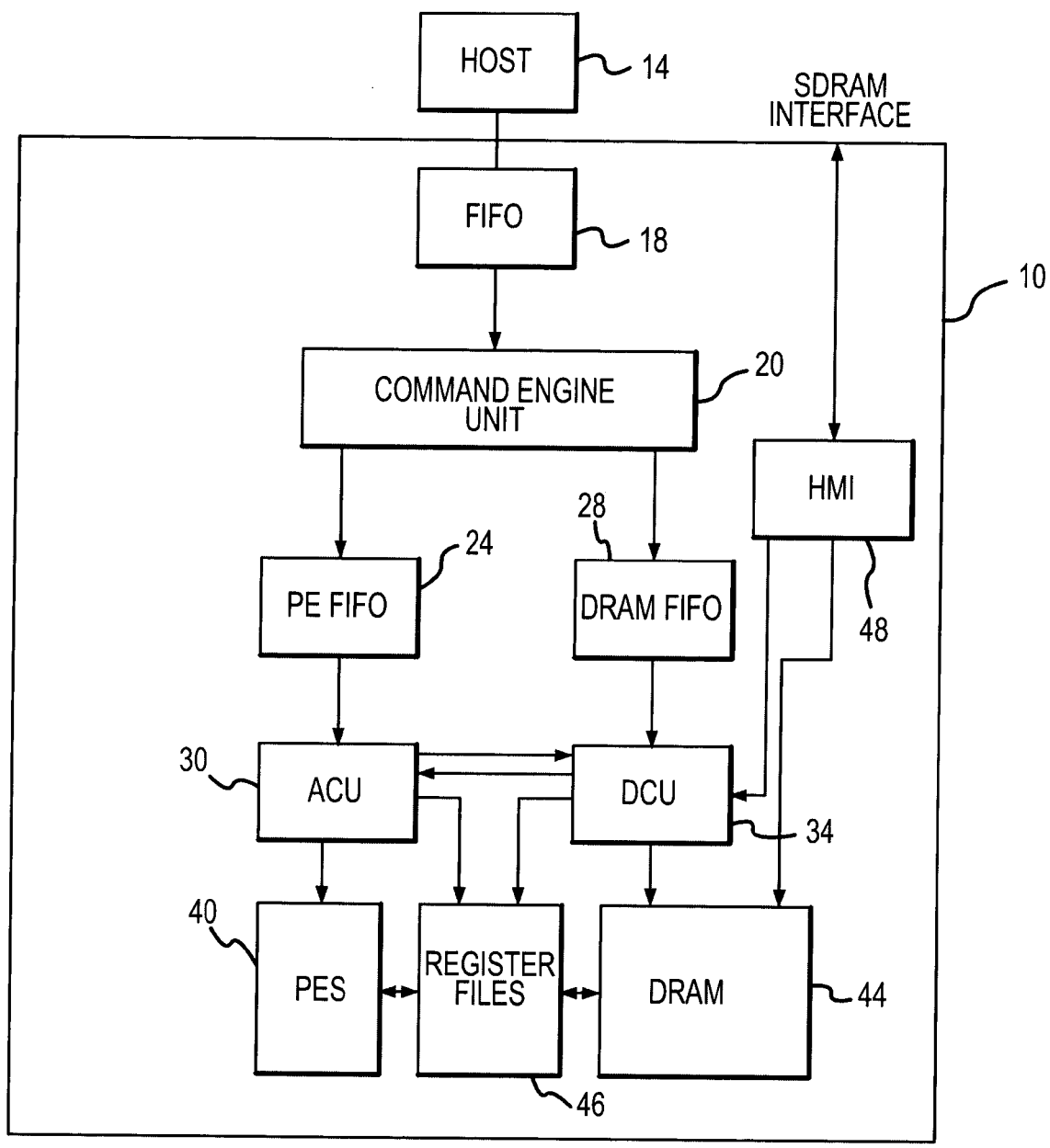
FIG. 1 is a block diagram of an active memory device according to one embodiment of the invention.

FIG. 1 shows an active memory device 10 according to one embodiment of the invention. The memory device 10 is coupled to a host 14, such as a microprocessor, although it may be coupled to other devices that supply high-level instructions to the memory device 10. The memory device 10 includes a first in, first out ("FIFO") buffer 18 that receives high level tasks from the host 14. Each task includes a task command and may include a task address. The received task commands are buffered by the FIFO buffer 18 and passed to a command engine unit 20 at the proper time and in the order in which they are received. The command engine unit 20 generates respective sequences of commands corresponding to received task commands. As described in greater detail below, the commands are at a lower level than the task commands received by the command engine unit 20. The commands are coupled from the command engine unit 20 to either a processing element ("PE") FIFO buffer 24 or a dynamic random access memory ("DRAM") FIFO buffer 28 depending upon whether the commands are PE commands or DRAM commands. If the commands are PE commands, they passed to the PE FIFO buffer 24 and then from the FIFO buffer 24 to a processing array control unit ("ACU") 30. If the commands are DRAM commands, they are passed to the DRAM FIFO buffer 28 and then to a DRAM Control Unit ("DCU") 34.

As explained in greater detail below, the ACU 30 executes an intrinsic routine containing several instructions responsive to the command from the FIFO buffer 24, and these instructions are executed by an array of PEs 40. The PE's operate as SIMD processors in which all of the PEs 40 receive and simultaneously execute the same instructions, but they do so on different data or operands. In the embodiment shown in FIG. 1, there are 256 PE's 40 each of which is coupled to receive 8 bits of data from the DRAM 44 through register files 46. In the embodiment shown in FIG. 1, the DRAM 44 stores 16M bytes of data. However, it should be understood that the number of PEs used in the active memory device 10 can be greater or lesser than 256, and the storage capacity of the DRAM 44 can be greater or lesser than 16 Mbytes.

Different intrinsic routines containing different instructions are issued by the ACU 30 for different commands received from the FIFO buffer 24. As also explained below, the DCU 34 issues memory commands and addresses responsive to commands from the DRAM FIFO buffer 34. In response, data are either read from a DRAM 44 and transferred to the register files 46, or written to the DRAM 44 from the register files 46. The register files 46 are also available to the PE's 40. The ACU 30 and the DCU 34 are coupled to each other so the operation of each of them can be synchronized to the other. The ACU 30 and DCU 34 are also coupled directly to the register files 38 so that they can control their operation and timing.

With further reference to FIG. 1, the DRAM 44 may also be accessed by the host 14 directly through a host/memory interface ("HMI") port 48. The HMI port is adapted to receives a command set that is substantially similar to the command set of a conventional SDRAM except that it includes signals for performing a "handshaking" function with the host 14. These commands include, for example, ACTIVE, PRECHARGE, READ, WRITE, etc. In the embodiment shown in FIG. 1, the HMI port 48 includes a 32-bit data bus and a 14-bit address bus, which is capable of addressing 16,384 pages of 256 words. The address mapping mode is configurable to allow data to be accessed as 8, 16 or 32 bit words.

In a typical processing task, data read from the DRAM 44 are stored in the register files 46. The data stored in the register files 46 are then transferred to the PEs 40 where they become one or more operands for processing by the PEs 40. Groups of data bits read from or written to each set of DRAM columns are processed by respective PEs 40. The data resulting from the processing are then transferred from the PEs 40 and stored in the register files 46. Finally, the results data stored in the register files 46 are written to the DRAM 44.

The PEs 40 operate in synchronism with a processor clock signal (not shown in FIG. 1). The number of processor clock cycles required to perform a task will depend upon the nature of the task and the number of operands that must be fetched and then stored to complete the task. In the embodiment of FIG. 1, DRAM operations, such as writing data to and reading data from the DRAM 44, requires about 16 processor clock cycles. Therefore, for example, if a task requires transferring three operands into and of the DRAM 44, the task will require a minimum of 48 cycles.

Figure 2:
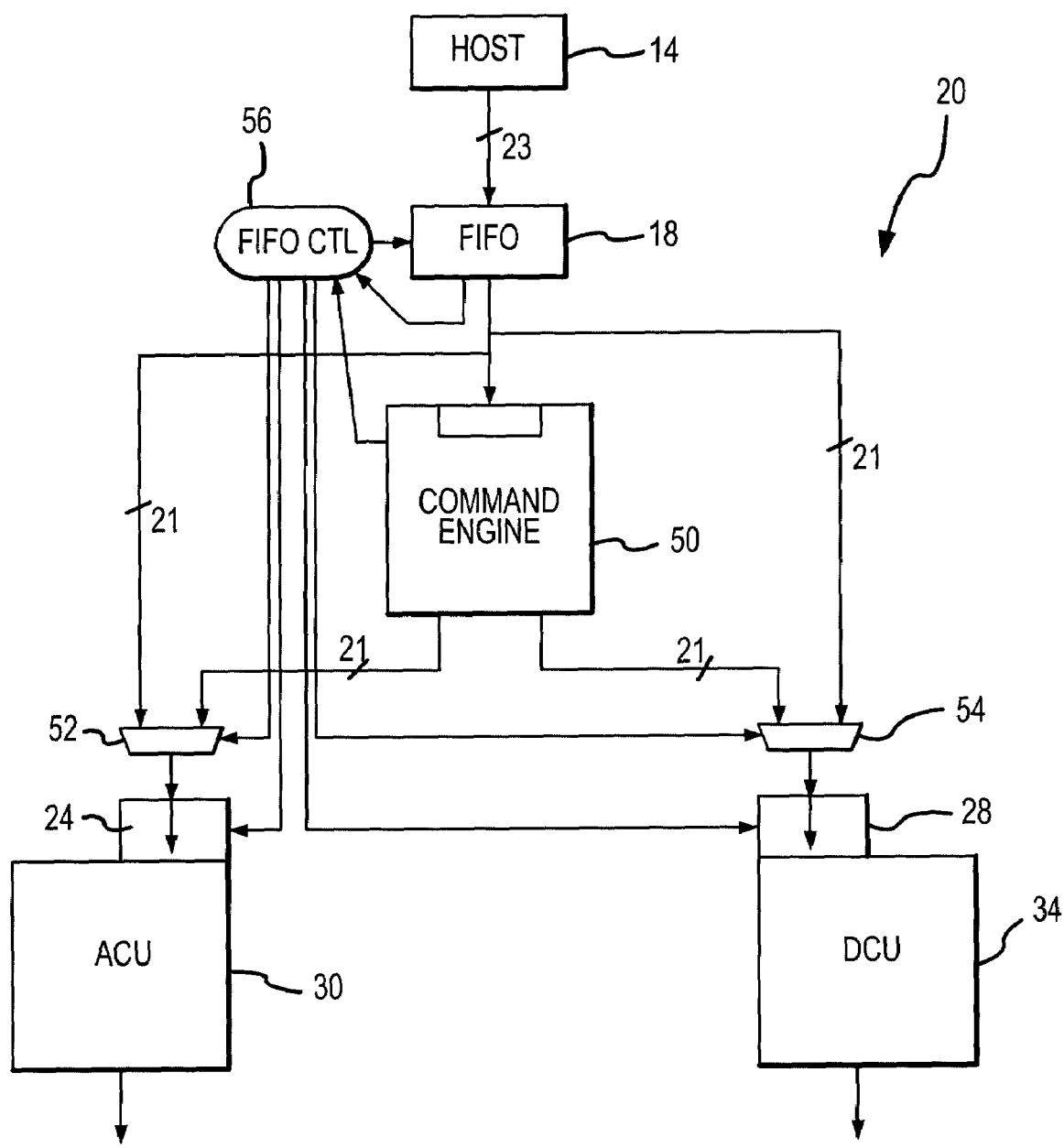
FIG. 2 is a block diagram of a command engine used in the active memory device of FIG. 1.

One embodiment of the command engine unit 20 is shown in FIG. 2. The command engine unit 20 includes a command engine 50 that issues either ACU commands or DCU commands responsive to task commands received from the FIFO buffer 18. The command engine 50 passes ACU commands to the PE FIFO buffer 24 through a multiplexer 52, and DCU commands to the DRAM FIFO buffer 28 through a multiplexer 54. The operations of the FIFO buffers are controlled by a FIFO buffer control unit 56. The multiplexers 52, 54 also receive inputs directly from the FIFO buffer 18. The multiplexers 52, 54 couple the outputs from the command engine 50 to the ACU 30 and DCU 34, respectively, in normal operation. However, the multiplexer 52 may couple the host 14 directly to the ACU 30, and the multiplexer 54 may couple the host 14 directly to the DCU 34 for diagnostic purposes and, under some circumstances, for programming and controlling the ACU 30 and DCU 34.

In the embodiment shown in FIG. 2, the task commands passed to the command logic each have 23 bits, and they have the format shown in the following Table 1:

TABLE 1

| 22 | 21 | 20 | 19 | 18 | 17 | 16 | Bits 15–0 |
|---|---|---|---|---|---|---|---|
| Device Select | | SG | WT | Device Specific Function | | | Command Data |

Bits 22 and 21 identify the task as either a PE task or a DRAM task, the SG bit is a signal flag, the WT bit is a wait flag that is used with the signal flag SG to perform handshaking functions during the transfer of data, bits 18–16 designate the function performed by the task (e.g., jump, page or data for a PE task or read, write, refresh, etc. for a DRAM task), and bits 15–0 comprise a 16-bit data word that can constitute an operation code or data that is either operated on or used to generate an address. In operation, for example, the first task passed to the command logic may designate a specific operation to be performed by the PEs 40 on an operand received from the DRAM 44. The task will include device select bits to select either the ACU 30 or the DCU 34, bits 18–16 that indicate a specific function, and bits 15–0 that may constitute an operation code corresponding to the specific operation. The wait flag WT may also be set to indicate to the PEs 40 that they should not immediately perform the function. The next task may be to transfer the operand from the DRAM 44. In such case, the task command will include device bits to select the DCU 34, bits 18–16 that identify a function, and bits 15–0 can provide the address in the DRAM 44 from which the operand is being transferred. The task will also include a signal flag SG that will be coupled from the DCU 34 to the ACU 30 to specify that the PEs 40 can now perform the specified processing function. After the operand has been processed by the PEs 40, the results data are passed from the PEs 40 back to the DRAM 44 using a similar handshaking sequence.

The instruction set for the command engine 20 is shown in the following Table 2:

TABLE 2

| Gr. | Mnemonic | Operation | Op code | Comment |
|---|---|---|---|---|
| 0 | Control Instructions | | | |
| | NOP | PC=PC+1 | 0000 0000 0000 0000 | |
| | ALERT | | 0000 0001 0000 0000 | Send alert (interrupt) to host. |
| | WAITSYS | | 0000 1111 0000 0000 | Wait for data in FIFO and branch. |
| | Shifts | | | |
| | RL | C=U(15),U=(U<<1,C) | 0000 0110 0000 0000 | Rotate left through carry |
| | RR | C=U(0),U=(C,U>>1) | 0000 0111 0000 0000 | Rotate right through carry |
| 0 | Bit Operations | | | |
| | BITS | U=U|(0x8000>>b) | 0000 1000 0000 bbbb | Bit set |
| | BITC | U=U&~(0x8000>>b) | 0000 1001 0000 bbbb | Bit clear |
| | BITT | Z=((U&(0x8000>>b)) | 0000 1010 0000 bbbb | Bit test=> Z |
| 1 | Relative Branch | | | |
| | BRR cond?@BR R+#i | PC=cond?@BRR+3+ #i | 0001 cccc iiii iiii | Relative branch |
| 2 | Precalculated Branch/Call | | | |
| | BR cond?reg | PC=cond?reg | 0010 cccc 00rr rrrr | Precalculated target in register. |
| | CALL cond?reg | PC=cond?reg | 0010 cccc 10rr rrrr | Precalculated target in register. |
| 3 | Arithmetic and Logical | | | |
| | ADD reg | U=U+R | 0011 m100 00rr rrrr | |
| | ADDC reg | U=U+R+C | 0011 m100 10rr rrrr | |
| | SUB reg | U=U−R | 0011 m101 00rr rrrr | |
| | SUBC reg | U=U−R+C | 0011 M101 10rr rrrr | |
| | AND reg | U=U&R | 0011 m110 00rr rrrr | |
| | OR reg | U=U|R | 0011 m110 10rr rrrr | |
| | XOR reg | U=U^R | 0011 m111 00rr rrrr | |
| | <spare> reg | U=U?R | 0011 m111 10rr rrrr | |
| 4 | Immediate Add | | | |
| | ADD #imm | U=U+#i | 0100 m100 iiii iiii | #i is sign extended to 16 bits |
| 5,6 | Immediates | | | |
| 5 | IMME n | U=decoded(N) | 0101 m100 nnnn nnnn | See Table 2-3 for encoding of N |
| 6 | IMM k | U=(#k,#k) | 0110 m100 kkkk kkkk | K is copied to both bytes |
| 7,8,9 | Moves | | | |
| 7 | MOVR reg u | U=R etc | 0111 m10X h1rr rrrr | U is modified if U is 1. LS byte is modified if l is 1, MS byte is modified if m is 1. Bytes are exchanged if X is 1. Replaces all MOVR, SWAP and MERGE, MOVRL, MOVRH instructions. |
| 8 | MOVU reg | R=U | 1000 0000 00rr rrrr | |
| | MOVPG reg | R=PAGE | 1000 0010 00rr rrrr | Loads reg with page portion of PC |
| | MOVPC reg | R=PC | 1000 0011 00rr rrrr | Loads reg with @MOVPC+6 |

TABLE 2-continued

| Gr. | Mnemonic | Operation | Op code | Comment |
|---|---|---|---|---|
| | STATUS | R=[status] | 1000 10ss ssrr rrrr | Load register from DCU and ACU status. S selects which status register. |
| | ACU_RESULT | R=[ACU result] | 1000 11wd 00rr rrrr | Load register from ACU Out FIFO. If w is set, instruction will wait until FIFO empty flag is off before reading the FIFO and continuing execution. If d is set read will be destructive: the next word will be fetched from the FIFO. |
| 9 | MOVS reg {u,r2a} | R U=inF | 1001 m1w0 00rr rrrr | Load register directly from in FIFO. U is modified if U is 1. RF reg is modified if w=1. |
| | MOVR_PG | NEXT_PAGE=reg | 1001 0000 0100 0000 | (Mnemonic is MOVU) |
| | MOVU_S | outF=U | 1001 0000 1000 0000 | (Mnemonic is MOVU) |
| | MOVR_S reg | outF=R | 1001 0000 11rr rrrr | (Mnemonic is MOVR) |
| A | Skip and SETSn | | | |
| | SKIP | if (cond) skip next instructions | 1010 cccc 0000 dddd | C is condition. D is number of instructions to skip-1 |
| | SETS | Sn=<cond> | 1010 cccc ss00 0000 | C is condition. S determines which S flag is loaded (S1 or S2). |
| B–C | Commands | | | |
| B | DCU_FIFO | DCU_FIFO = DCU_OP(s,w,d)U | 1011 ddss wwtt t0000 | T: DCU task type: see Table 2-2. D: defer buffer. If 0 task is written immediately. If 1,2,3 command is pushed into the defer buffer of that number. S: Select generation of signal bit (s) in DCU command: S=0 ->s=0; S=1 ->s=S1 flag; S=2 ->s=S2 flag; S=3 ->s=1. W: Select generation of wait bit (w) in DCU command: W=0 ->w=0; W=1 ->w=S1; W=2 ->w=S2; W=3 ->w=1. |
| C | ACU_DATA | ACU_InFIFO=R ACU_InFIFO=Page[R] | 1100 ff01 00rr rrrr | Data read from register file. F: ACU function: 0—data; 1—(reserved); 2—page; (3—intrinsic call). |

TABLE 2-continued

| Gr. | Mnemonic | Operation | Op code | Comment |
|---|---|---|---|---|
| | ACU_TASK | ACU_InFIFO=OPCALL | 1100 11ss wwrr rrrr | Intrinsic routine address held in register. S and W do the same sa for DCU_FIFO. |
| D | Unused, Reserved | | | |
| E | Return Stack PUSH and POP | | | |
| | PUSH | *(++rsp)<=U | 1110 0000 0000 0000 | rsp=return stack pointer. Note pre-increment |
| | POP | U<=*(rso--) | 1110 1000 0000 0000 | Note post-decrement. |
| F | Memory Operations: multicycle instructions | | | |
| | M_LOAD | U<=*R | 1111 0000 00rr rrrr | Load U from memory, addressed by register |
| | M_LOADP | U<=*R ++ | 1111 0010 00rr rrrr | Load U from memory, post-increment address register |
| | M_LOADN | U<=*R-- | 1111 0100 00rr rrrr | Load U from memory, post-decrement address register |
| | M_STORE | *R<=U | 1111 1000 00rr rrrr | Store U in memory, addressed by register |
| | M_STOREP | *R++<=U | 1111 1010 00rr rrrr | Store U in memory, post-decrement address register. |
| | M_STOREN | *R==<=U | 1111 1100 00rr rrrr | Store U in memory, post-decrement address register. |

Figure 3:
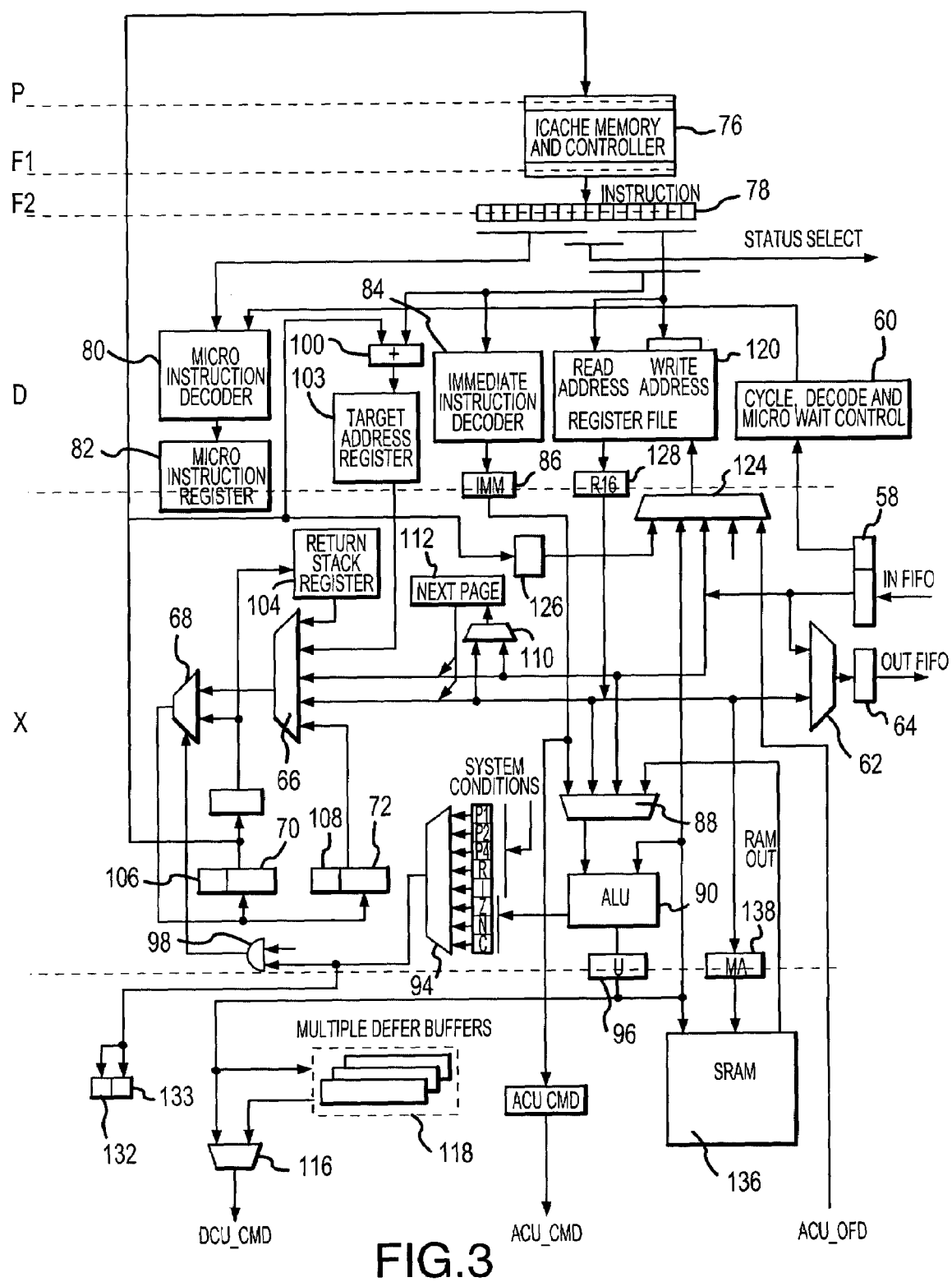
FIG. 3 is a block and logic diagram of the command engine of FIG. 2 according to one embodiment of the invention.

One embodiment of the command engine 50 that may be used in the command engine unit 20 is shown in FIG. 3. The task commands are coupled to the command engine 50 from the FIFO buffer 18 (FIG. 2) and are applied to an input FIFO buffer 58. The flag bits 20, 19 and the Device Specific Function bits 18–16 are passed to a Cycle, Decode and Microwait Control Unit 60, which determines the function being performed by the task and coordinates handshaking using the SG and WT flags. The remaining Device Select bits 22, 21 and the Command Data bits 15–0 are routed to several locations. The output of the FIFO buffer 58 is coupled to a control input of a multiplexer 62. If the Command Data corresponds to an instruction that the command engine 50 pass data back to the host 14, the multiplexer 62 is enabled to pass the output data to an output FIFO buffer 64. The Cycle, Decode and Microwait Control Unit 60 is also operable to stall the operation of the FIFO buffers 58, 62 when they are full.

If the device specific function bits correspond to a jump in which instructions are to be executed starting from a jump address, the jump address is coupled through a first multiplexer 66 and a second multiplexer 68 to set a program counter 70 and a delayed program counter 72 to the jump address. The jump address is then used to address an Instruction Cache Memory and Controller 76, which outputs an instruction 78 stored at the jump address. The Instruction Cache Memory and Controller 76 is normally loaded by a cache controller (not shown) with instructions from a program memory (not shown), both of which are included in a computer system (not shown) coupled to the active memory 10. The Instruction Cache Memory and Controller 76 can be loaded with different sets of instructions depending upon the type of task commands that will be passed to the active memory 10.

A portion of the instruction 78 is decoded by a microinstruction decoder 80, which outputs a corresponding microinstruction to a microinstruction register 82. The microinstructions control the internal operation of the command engine 50, such as the FIFO buffers, multiplexers, etc. The microinstructions are also used to form all or portions of DCU and ACU commands. The signal paths from the microinstruction register 82 are numerous, and, in the interest of clarity, have been omitted from FIG. 3. The DCU commands and ACU commands are shown in Groups B and C, respectively, of Table 2. The DCU commands shown in Group B include defer bits "dd" to delay the operation of a command, signal and wait bits "ss" and "ww" bits that are used as described above, and a task type "t," which is normally included in the task received from the host 14. The value of the signal and wait bits are stored in respective registers 132, 133. As explained above, the defer values "dd" can be part of a DCU command, as shown in Table 3.

The DCU commands are shown in Table 3 as follows:

TABLE 3

| Bit 20 Flags | Bit 19 | Bits 18–16 Function | Bits 15–8 | Bits 7–0 Data |
|---|---|---|---|---|
| SG | | 0:Null | | |
| | | 1:RFA_L | Byte count | Array RF address |
| | | 2:Read | | DRAM Base address |
| | | 3:Write | | DRAM Base address |
| | | 4:Power-up | | |
| | | 5:Refresh | | |
| | | 6:Sleep | | |
| | | 7:Ld Mode | | |

As shown in Table 3, the DCU commands are Null, Power up, Refresh, Sleep and Load Mode, as well as Read and Write, which are accompanied by a Base address in the DRAM 44, and a register file address ("RFA_1") command, which is accompanied by the Byte count indicative of the number of bytes that are to be transferred to or from the register files 46, and an Array RF address, which is the address of the register file to or from which the data will be transferred.

The ACU commands shown in Group C include data commands and task commands, as shown in Table 4:

TABLE 4

| | b20 | b19 | Bits18–16 Function | Bits 15–0 Data |
|---|---|---|---|---|
| Jump | SG | WT | 3 | Start Address of Microroutine |
| Page | 0 | 0 | 2 | (unused) Page address |
| Data | 0 | 0 | 0 | Data |

The data command simply includes 16 bits of data, which are transferred from the register file 120. Data may also be transferred from the ACU 30 to the register file 120 by passing the data designated "acu_ofd" through the multiplexer 124. The task commands include either a jump address or a page address where task instructions are stored.

As mentioned above, the tasks shown in Table 1 that are passed to the command generator 50 include 16 command data bits, which may constitute data that is to be either operated on or used to form an address. In the event a data word larger than 16 bits is required in an operation corresponding to an instruction, the instruction may be preceded by an immediate instruction, which are shown in Groups 4–6 of Table 2. For example, an Immediate Add instruction shown in Group 4 of Table 2 indicates that a data value having more than 16 bits is to be added to the contents of a U register 96.

The immediate instruction is decoded by an immediate instruction decoder 84 and the command data in the instruction is stored in an IMM register 86. The data stored in the IMM register 86 is combined with the command data in the subsequent instruction decoded by the instruction decoder 80 and stored in the microinstruction register 82. The combined data fields are then passed through a multiplexer 88 to an arithmetic and logical unit ("ALU") 90. The ALU 90 performs an arithmetic or logical operation on the data, and outputs the results to the U register 96. These operations, and the operation codes that respond to them, are shown in group 3 of Table 2.

The ALU 90 also provides several conditional values, one of which is selected by a multiplexer 94 for conditional branching of the program. These conditions are shown in table 5 as follows:

TABLE 5

| Code | Flag | Comment |
|---|---|---|
| 0 | Always | Always true |
| 1 | C | ALU Carry out |
| 2 | N | ALU result < 0 |
| 3 | Z | ALU result = 0 |
| 4 | IFE | Input FIFO empty |
| 5 | S1 | Signal/wait flag 1 |
| 6 | S2 | Signal/wait flag 2 |
| 7 | RFE | Result FIFO empty |
| 8 | Never | Always false |
| 9 | NC | !ALU carry out |
| A | NN | ALU result > 0 |
| B | NZ | ALU result ! = 0 |
| C | NIFE | Inut FIFO not empty |
| D | NS1 | S1 not set |
| E | NS2 | S2 not set |
| F | NRFE | Result FIFO not empty |

The C, N, Z, NC, NN and NZ flags are provided by the ALU 30. The remaining flags by various conditions that arise in the active memory device 10, such as of FIFO buffers and by being directly set or cleared.

A signal indicative of a branch conditioned on the variable selected by the multiplexer 94 is coupled to a gate 98, which is enabled by an active BRANCH microinstruction, to cause the multiplexer 68 to couple the jump address from the FIFO buffer 54 to the program counters 70, 72, as previously explained. The ALU 90 may also output a return stack of instructions to be stored in a U register 96 for subsequently restoring the program to a location prior to a branch.

Assuming there is no branch to a jump address, the count from the program counter 70 is incremented by an adder 100 to provide an incremented instruction count that is stored in a return stack register 104 and is coupled through the multiplexers 66, 68 to write the incremented count to the program counter 70. Each command in a routine corresponding to the task command from the host 14 is thus sequentially executed. The program count is also coupled to an adder 100 that can also receive an offset address forming part of the instruction 78. The adder offsets the program address by a predetermined magnitude to generate a target address that is stored in a target address register 103. This target address is coupled through the multiplexers 66, 68 to write the target address to the program counter 70. The program counter 70 then addresses the Icache memory and controller 76 at a location corresponding to the target address.

If the device specific function bits correspond to a page instruction, a page address is coupled through the multiplexers 66, 64 and stored in a page register 106 associated with the program counter 70. Alternatively, if an operation is a deferred operation, the page address is stored in a page register 108 associated with the delay program counter 72. The address space of the ACU can be increased by combining page addresses from two page instructions. In such case, a first page address is coupled though a multiplexer 110 and stored in a next page register 112. The next page address stored in the register 112 can then be combined with a page address from a subsequent page command to address a larger number of ACU program memory addresses storing ACU instructions.

The DCU commands, which include task bits from the instruction 78 as well as data from the U register, are passed through a DCU FIFO buffer 116. The DCU commands can also be stored in multiple defer buffers 118 and subsequently passed through the FIFO buffer 116. A dcu_cmd may be deferred, for example, if an operation must be carried out in the ACU 30 or PEs 40 before an operation in the DCU 34 or in the DRAM 44 should be carried out. As explained above, the defer values "dd" can be part of a DCU command as shown in Table 3.

The command engine 50 also includes a register file 120 that is addressed by a portion of the instructions 78. The register file 120 receives write data through a multiplexer 124 from various sources, most of which have been previously described. In particular the register file serves as scratch memory for the command generator 50. In addition to the data previously described, the register file 120 can also store a future program instruction address by incrementing the current program address from the program counter 70 using an adder 126, thereby storing a program address that is two instructions beyond the current instruction. Data read from the register file 120 is temporarily stored in an R12 register 128, where it is available at various locations. For example, the data from the register 128 may be passed though a multiplexer 130 to an output FIFO buffer 134, which then outputs the data to the host 14 (FIG. 1). The data from the register 128 is also used by the ALU 90 to perform various operations in connection with data from the U register 96, as shown in Group 3 of Table 2. The register file 120 provides only limited data storage capacity. An SRAM 136 is used to store larger quantities of data, which is transferred to the SRAM 136 from the U register 96. The SRAM 136 is addressed by addresses stored in a memory address register 138.

Although not shown in detail herein, the ACU 30 and the DCU 34 are slave processors that may be similar in structure and function to the command engine 50. The PEs 40 may be somewhat conventional execution units that operate using basic instructions provided by the ACU 30. The DRAM 44 is essentially the same as a conventional DRAM.

Figure 4:
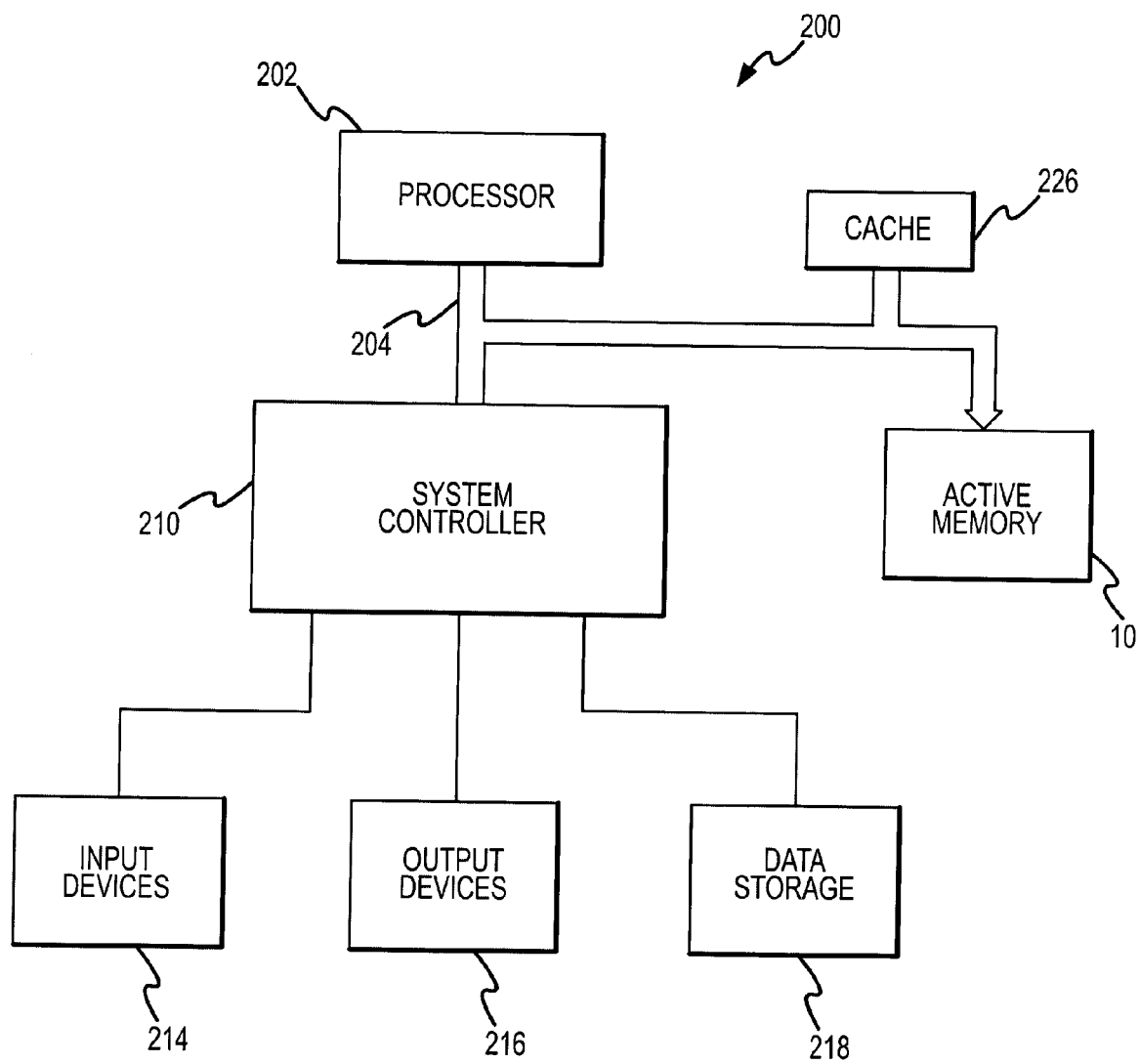
FIG. 4 is a block diagram of a computer system using the command engine of FIG. 1 according to one embodiment of the invention.

A computer system 200 using the active memory device 10 of FIG. 1 is shown in FIG. 4. The computer system 200 includes a processor 202 for performing various computing functions, such as executing specific software to perform specific calculations or tasks. The processor 202 includes a processor bus 204 that normally includes an address bus, a control bus, and a data bus. In addition, the computer system 200 includes one or more input devices 214, such as a keyboard or a mouse, coupled to the processor 202 through a system controller 210 to allow an operator to interface with the computer system 200. Typically, the computer system 200 also includes one or more output devices 216 coupled to the processor 202 through the system controller 210, such output devices typically being a printer or a video terminal. One or more data storage devices 218 are also typically coupled to the processor 202 through the system controller 210 to store data or retrieve data from external storage media (not shown). Examples of typical storage devices 218 include hard and floppy disks, tape cassettes, and compact disk read-only memories (CD-ROMs). The processor 202 is also typically coupled to a cache memory 226, which is usually static random access memory ("SRAM"). The processor 202 is also coupled through the data bus of the processor bus 204 to the active memory device 10 so that the processor 202 can act as a host 14, as explained above with reference to FIGS. 1 and 2.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An integrated circuit active memory device fabricated on a single semiconductor substrate, the active memory device comprising:
   a memory device having a data bus containing a plurality of data bus bits;
   an array of processing elements with each processing element coupled to a respective group of the data bus bits, each of the processing elements having an instruction input coupled to receive processing element instructions for controlling the operation of the processing elements;
   an array control unit coupled to the processing elements in the array, the array control unit being operable to generate and to couple respective sets of the processing element instructions to the processing elements responsive to each of a plurality of array control unit commands applied to a command input of the array control unit;
   a memory device control unit coupled to the memory device, the memory device control unit being operable to generate and to couple respective sets of memory commands to the memory device responsive to each of a plurality of memory device control unit commands applied to a command input of the memory device control unit; and
   a command engine coupled to the array control unit and the memory device control unit, the command engine being operable to couple to the array control unit respective sets of the array control unit commands and to couple to the memory device control unit respective sets of the memory device control unit commands responsive to respective task commands applied to a task command input of the command engine.

2. The active memory device of claim 1 wherein the memory device comprises a dynamic random access memory device.

3. The active memory device of claim 1, further comprising a memory device interface having a first set of terminals that are externally accessible from outside the integrated circuit and a second set of terminals that are coupled to the memory device, the memory device interface being operable to allow data to be externally written to and read from the memory device without being coupled through the memory device control unit.

4. The active memory device of claim 1, further comprising an array control unit bypass path allowing the command input of the array control unit to be coupled directly to the task command input.

5. The active memory device of claim 1, further comprising a memory device control unit bypass path allowing the command input of the memory device control unit to be coupled directly to the task command input.

6. The active memory device of claim 1 wherein the array control unit is operable to store the processing element instructions at respective addresses in a storage device included in the array control unit, and wherein the array control unit commands generated by the command generator comprise respective storage device addresses.

7. The active memory device of claim 1 wherein the array control unit commands are at a higher level than the respective task commands.

8. The active memory device of claim 1 wherein the memory device control unit commands are at a higher level than the respective task commands.

9. The active memory device of claim 1 wherein each of the task commands comprise:
   at least one device select bit that designates the task command as either a task command for the processing elements or a task command for the memory device, and
   a plurality of command data bits.

10. The active memory device of claim 9 wherein each of the task commands further comprise a plurality of device specific function bits that designate the function to be performed by the processing elements if the device select bit designates the processing elements and the function to be performed by the memory device if the device select bit designates the memory device.

11. The active memory device of claim 1 wherein the command engine comprises an internal instruction cache storing a plurality of instructions at respective addresses, and wherein the instruction cache is programmable to allow sets of instructions to be stored in the cache based on the nature of the task commands that will be applied to the task command input of the command engine.

12. The active memory device of claim 11 wherein the command engine comprises a program counter coupled to the instruction cache, the program counter outputting a program count that is used as the address for the instruction cache.

13. The active memory device of claim 12 wherein one of the task commands comprises a jump command including a jump address, and wherein the command engine is operable to preset the program counter to a count corresponding to the jump address responsive to decoding the jump command.

14. The active memory device of claim 12 wherein the command engine further comprises an adder coupled to the program counter to offset the count of the program counter by a predetermined magnitude.

15. The active memory device of claim 11 wherein the command engine further comprises a register file coupled to the instruction cache, the register file being operable to store data at locations corresponding to respective addresses, the register filed being addressed by at least a portion of the instructions stored in the instruction cache.

16. The active memory device of claim 1 wherein the command engine further comprises:
   an arithmetic and logic unit; and
   a register coupled to receive and store data resulting from an arithmetic or logical operation performed by the arithmetic and logic unit, the register applying the stored data to the array control unit and to the memory device control unit.

17. The active memory device of claim 16 wherein the arithmetic and logic unit is operable to receive data stored in the register responsive to a previous an arithmetic or logical operation.

18. The active memory device of claim 1 wherein the command engine further comprises at least one defer buffer operable to store the memory device control unit commands and to subsequently couple the memory device control unit commands to the memory device control unit.

19. An active memory control system, comprising:
   a first control device receiving task commands corresponding to respective active memory operations, the first control device being operable to generate either a respective set of memory commands or a respective set of processing commands responsive to each of the task commands, the processing commands being at a higher level than the respective task commands;
   a second control device coupled to receive the memory commands from the first control device, the second control device being operable to generate a respective set of the memory device instructions responsive to each of the memory commands; and
   a third control device coupled to receive the processing commands from the first control device, the third control device being operable to generate a respective set of the processing element instructions responsive to each of the processing commands.

20. The active memory control system of claim 19 wherein each of the task commands comprise:
   at least one device select bit that designates the task command as either a task command for the processing elements or a task command for the memory device, and
   a plurality of command data bits.

21. The active memory control system of claim 20 wherein each of the task commands further comprise a plurality of device specific function bits that designate the function to be performed by the processing elements if the device select bit designates the processing elements and the function to be performed by the memory device if the device select bit designates the memory device.

22. The active memory control system of claim 19 wherein the first control device comprises an instruction cache storing a plurality of instructions at respective addresses, and wherein the instruction cache is programmable to allow sets of instructions to be stored in the cache based on the nature of the task commands that are received by the first control device.

23. The active memory control system of claim 22 wherein the first control device comprises a program counter coupled to the instruction cache, the program counter outputting a program count that is used as the address for the instruction cache.

24. The active memory control system of claim 23 wherein one of the task commands comprises a jump command including a jump address, and wherein the first control device is operable to preset the program counter to a count corresponding to the jump address responsive to decoding the jump command.

25. The active memory control system of claim 23 wherein the first control device further comprises an adder coupled to the program counter to offset the count of the program counter by a predetermined magnitude.

26. The active memory control system of claim 22 wherein the first control device further comprises a register file coupled to the instruction cache, the register file being operable to store data at locations corresponding to respective addresses, the register filed being addressed by at least a portion of the instructions stored in the instruction cache.

27. The active memory control system of claim 19 wherein the first control device further comprises:
   an arithmetic and logic unit; and
   a register coupled to receive and store data resulting from an arithmetic or logical operation performed by the arithmetic and logic unit, the register applying the stored data to either the second control device or the third control device.

28. The active memory control system of claim 27 wherein the arithmetic and logic unit is operable to receive data stored in the register responsive to a previous an arithmetic or logical operation.

29. The active memory control system of claim 19 wherein the first control device further comprises at least one defer buffer operable to store the memory commands and to subsequently couple the memory commands to the second control device.

30. The active memory control system of claim 19 wherein the first control device, the second control device and the third control device are fabricated on a common integrated circuit substrate.

31. A computer system, comprising:
a host processor having a processor bus;
at least one input device coupled to the host processor through the processor bus;
at least one output device coupled to the host processor through the processor bus;
at least data storage device coupled to the host processor through the processor bus; and
an active memory device, comprising:
  a memory device having a data bus containing a plurality of data bus bits;
  an array of processing elements with each processing element coupled to a respective group of the data bus bits, each of the processing elements having an instruction input coupled to receive processing element instructions for controlling the operation of the processing elements;
  an array control unit coupled to the processing elements in the array, the array control unit being operable to generate and to couple respective sets of the processing element instructions to the processing elements responsive to each of a plurality of array control unit commands applied to a command input of the array control unit;
  a memory device control unit coupled to the memory device, the memory device control unit being operable to generate and to couple respective sets of memory commands to the memory device responsive to each of a plurality of memory device control unit commands applied to a command input of the memory device control unit; and
  a command engine coupled to the array control unit and the memory device control unit, the command engine being operable to couple to the array control unit respective sets of the array control unit commands and to couple to the memory device control unit respective sets of the memory device control unit commands responsive to respective task commands applied to a task command input of the command engine from the host processor.

32. The computer system of claim 31 wherein the memory device comprises a dynamic random access memory device.

33. The computer system of claim 31, further comprising a memory device interface having a first set of terminals that are externally accessible from outside the integrated circuit and a second set of terminals that are coupled to the memory device, the memory device interface being operable to allow data to be externally written to and read from the memory device without being coupled through the memory device control unit.

34. The computer system of claim 31, further comprising an array control unit bypass path allowing the command input of the array control unit to be coupled directly to the task command input.

35. The computer system of claim 31, further comprising a memory device control unit bypass path allowing the command input of the memory device control unit to be coupled directly to the task command input.

36. The computer system of claim 31 wherein the array control unit is operable to store the processing element instructions at respective addresses in a storage device included in the array control unit, and wherein the array control unit commands generated by the command generator comprise respective storage device addresses.

37. The computer system of claim 31 wherein the array control unit commands are at a higher level than the respective task commands.

38. The computer system of claim 31 wherein the memory device control unit commands are at a higher level than the respective task commands.

39. The computer system of claim 31 wherein each of the task commands comprise:
at least one device select bit that designates the task command as either a task command for the processing elements or a task command for the memory device, and
a plurality of command data bits.

40. The computer system of claim 39 wherein each of the task commands further comprise a plurality of device specific function bits that designate the function to be performed by the processing elements if the device select bit designates the processing elements and the function to be performed by the memory device if the device select bit designates the memory device.

41. The computer system of claim 31 wherein the command engine comprises an internal instruction cache storing a plurality of instructions at respective addresses, and wherein the instruction cache is programmable to allow sets of instructions to be stored in the cache based on the nature of the task commands that will be applied to the task command input of the command engine.

42. The computer system of claim 41 wherein the command engine comprises a program counter coupled to the instruction cache, the program counter outputting a program count that is used as the address for the instruction cache.

43. The computer system of claim 42 wherein one of the task commands comprises a jump command including a jump address, and wherein the command engine is operable to preset the program counter to a count corresponding to the jump address responsive to decoding the jump command.

44. The computer system of claim 42 wherein the command engine further comprises an adder coupled to the program counter to offset the count of the program counter by a predetermined magnitude.

45. The computer system of claim 41 wherein the command engine further comprises a register file coupled to the instruction cache, the register file being operable to store data at locations corresponding to respective addresses, the register filed being addressed by at least a portion of the instructions stored in the instruction cache.

46. The computer system of claim 31 wherein the command engine further comprises:
an arithmetic and logic unit; and
a register coupled to receive and store data resulting from an arithmetic or logical operation performed by the arithmetic and logic unit, the register applying the stored data to the array control unit and to the memory device control unit.

47. The computer system of claim 16 wherein the arithmetic and logic unit is operable to receive data stored in the register responsive to a previous an arithmetic or logical operation.

48. The computer system of claim 31 wherein the command engine further comprises at least one defer buffer operable to store the memory device control unit commands and to subsequently couple the memory device control unit commands to the memory device control unit.

49. The computer system of claim 31 wherein the array control unit, the memory device control unit and the command engine are fabricated on a common integrated circuit substrate.

50. The computer system of claim 31 wherein the array control unit, the memory device control unit, the command engine, the memory device and the processing elements are fabricated on a common integrated circuit substrate.

51. A method of controlling the operation of a memory device and an array of processing elements that are coupled to the memory device, the method comprising:
receiving a task command corresponding to an active memory operation;
responsive to the task command, generating either a set of array commands or a set of memory device commands;
responsive to each of the array commands, generating a respective set of processing element instructions;
responsive to each of the memory device commands, generating a respective set of memory device instructions;
coupling the processing element instructions to the processing elements; and
coupling the memory device instructions to the memory device.

52. The method of claim 51 wherein the memory device comprises a dynamic random access memory device.

53. The method of claim 51, further comprising generating a set of processing element instructions directly from a task command without first generating an array command.

54. The method of claim 51, further comprising generating a set of memory device instructions directly from a task command without first generating a memory device command.

55. The method of claim 51 wherein at least some of the array commands comprise respective storage device addresses, and wherein the act of generating the processing element instructions comprises:
storing the processing element instructions at respective addresses in a storage device; and
using the array commands to address the storage device.

56. The method of claim 51 wherein the task commands are at a higher level than the array commands in the respective set.

57. The method of claim 51 wherein the task commands are at a higher level than the memory device commands in the respective set.

58. The method of claim 51 wherein each of the task commands comprise:
at least one device select bit that designates the task command as either a task command for the processing elements or a task command for the memory device, and
a plurality of command data bits.

59. The method of claim 58 wherein each of the task commands further comprise a plurality of device specific function bits that designate the function to be performed by the processing elements if the device select bit designates the processing elements and the function to be performed by the memory device if the device select bit designates the memory device.

60. The method of claim 51 wherein the act of generating the array commands and the memory device commands comprises:
storing a plurality of instructions in an instruction cache, the instructions being stored in the instruction cache based on the nature of the task commands from which the array command and the memory device commands will be generated;
using the task commands to address the instruction cache; and
generating the array commands and the memory device commands from the instructions stored in the instruction cache that are addressed by the task commands.

61. The method of claim 60 wherein the act of using the task commands to address the instruction cache comprises:
using a program counter to address the instruction cache; and
presetting the program counter to a count corresponding to a jump address in a jump task command.

62. The method of claim 61, further comprising offsetting the count of the program counter by a predetermined magnitude.

63. The method of claim 51 wherein the act of generating the memory device commands comprises deferring at least some of the memory device commands in a set from being generated responsive to a respective task command.

64. The method of claim 51 wherein the act of generating the array commands comprises deferring at least some of the array commands in a set from being generated responsive to a respective task command.

65. An active memory control system, comprising:
a first control device receiving task commands corresponding to respective active memory operations, the first control device being operable to generate either a respective set of memory commands or a respective set of processing commands responsive to each of the task commands, each of each of the task commands comprising:
at least one device select bit that designates the task command as either a task command for the processing elements or a task command for the memory device, and
a plurality of command data bits;
a second control device coupled to receive the memory commands from the first control device, the second control device being operable to generate a respective set of the memory device instructions responsive to each of the memory commands; and
a third control device coupled to receive the processing commands from the first control device, the third control device being operable to generate a respective set of the processing element instructions responsive to each of the processing commands.

66. The active memory control system of claim 65 wherein each of the task commands further comprise a plurality of device specific function bits that designate the function to be performed by the processing elements if the device select bit designates the processing elements and the function to be performed by the memory device if the device select bit designates the memory device.

67. The active memory control system of claim 65 wherein the first control device comprises an instruction cache storing a plurality of instructions at respective addresses, and wherein the instruction cache is programmable to allow sets of instructions to be stored in the cache based on the nature of the task commands that are received by the first control device.

68. The active memory control system of claim 67 wherein the first control device comprises a program counter coupled to the instruction cache, the program counter outputting a program count that is used as the address for the instruction cache.

69. The active memory control system of claim 68 wherein one of the task commands comprises a jump command including a jump address, and wherein the first control device is operable to preset the program counter to a count corresponding to the jump address responsive to decoding the jump command.

70. The active memory control system of claim 68 wherein the first control device further comprises an adder coupled to the program counter to offset the count of the program counter by a predetermined magnitude.

71. The active memory control system of claim 67 wherein the first control device further comprises a register file coupled to the instruction cache, the register file being operable to store data at locations corresponding to respective addresses, the register filed being addressed by at least a portion of the instructions stored in the instruction cache.

72. The active memory control system of claim 65 wherein the first control device further comprises:
an arithmetic and logic unit; and
a register coupled to receive and store data resulting from an arithmetic or logical operation performed by the arithmetic and logic unit, the register applying the stored data to either the second control device or the third control device.

73. The active memory control system of claim 72 wherein the arithmetic and logic unit is operable to receive data stored in the register responsive to a previous an arithmetic or logical operation.

74. The active memory control system of claim 65 wherein the first control device further comprises at least one defer buffer operable to store the memory commands and to subsequently couple the memory commands to the second control device.

75. The active memory control system of claim 65 wherein the first control device, the second control device and the third control device are fabricated on a common integrated circuit substrate.

76. An active memory control system, comprising:
a first control device receiving task commands corresponding to respective active memory operations, the first control device being operable to generate either a respective set of memory commands or a respective set of processing commands responsive to each of the task commands, the first control device comprising an instruction cache storing a plurality of instructions at respective addresses, the instruction cache being programmable to allow sets of instructions to be stored in the cache based on the nature of the task commands that are received by the first control device;
a second control device coupled to receive the memory commands from the first control device, the second control device being operable to generate a respective set of the memory device instructions responsive to each of the memory commands; and
a third control device coupled to receive the processing commands from the first control device, the third control device being operable to generate a respective set of the processing element instructions responsive to each of the processing commands.

77. The active memory control system of claim 76 wherein the first control device comprises a program counter coupled to the instruction cache, the program counter outputting a program count that is used as the address for the instruction cache.

78. The active memory control system of claim 77 wherein one of the task commands comprises a jump command including a jump address, and wherein the first control device is operable to preset the program counter to a count corresponding to the jump address responsive to decoding the jump command.

79. The active memory control system of claim 77 wherein the first control device further comprises an adder coupled to the program counter to offset the count of the program counter by a predetermined magnitude.

80. The active memory control system of claim 76 wherein the first control device further comprises a register file coupled to the instruction cache, the register file being operable to store data at locations corresponding to respective addresses, the register filed being addressed by at least a portion of the instructions stored in the instruction cache.

81. The active memory control system of claim 76 wherein the first control device further comprises:
an arithmetic and logic unit; and
a register coupled to receive and store data resulting from an arithmetic or logical operation performed by the arithmetic and logic unit, the register applying the stored data to either the second control device or the third control device.

82. The active memory control system of claim 81 wherein the arithmetic and logic unit is operable to receive data stored in the register responsive to a previous an arithmetic or logical operation.

83. The active memory control system of claim 76 wherein the first control device further comprises at least one defer buffer operable to store the memory commands and to subsequently couple the memory commands to the second control device.

84. The active memory control system of claim 76 wherein the first control device, the second control device and the third control device are fabricated on a common integrated circuit substrate.

85. An active memory control system, comprising:
a first control device receiving task commands corresponding to respective active memory operations, the first control device being operable to generate either a respective set of memory commands or a respective set of processing commands responsive to each of the task commands, the first control device comprising:
an arithmetic and logic unit; and
a register coupled to receive and store data resulting from an arithmetic or logical operation performed by the arithmetic and logic unit;
a second control device coupled to receive the memory commands from the first control device and the stored data from the register, the second control device being operable to generate a respective set of the memory device instructions responsive to each of the memory commands; and
a third control device coupled to receive the processing commands from the first control device and the stored data from the register, the third control device being operable to generate a respective set of the processing element instructions responsive to each of the processing commands.

86. The active memory control system of claim 85 wherein the arithmetic and logic unit is operable to receive data stored in the register responsive to a previous an arithmetic or logical operation.

87. The active memory control system of claim 85 wherein the first control device further comprises at least one defer buffer operable to store the memory commands and to subsequently couple the memory commands to the second control device.

88. The active memory control system of claim 85 wherein the first control device, the second control device and the third control device are fabricated on a common integrated circuit substrate.

89. An active memory control system, comprising:
a first control device receiving task commands corresponding to respective active memory operations, the first control device being operable to generate either a respective set of memory commands or a respective set of processing commands responsive to each of the task commands, the first control device comprising at least one defer buffer operable to store the memory commands and to subsequently output the memory commands;
a second control device coupled to receive the memory commands from the at least one defer buffer in the first control device, the second control device being operable to generate a respective set of the memory device instructions responsive to each of the memory commands; and
a third control device coupled to receive the processing commands from the first control device, the third control device being operable to generate a respective set of the processing element instructions responsive to each of the processing commands.

90. The active memory control system of claim 89 wherein the first control device, the second control device and the third control device are fabricated on a common integrated circuit substrate.

91. An active memory control system, comprising:
a first control device fabricated on an integrated circuit substrate, the first control device receiving task commands corresponding to respective active memory operations, the first control device being operable to generate either a respective set of memory commands or a respective set of processing commands responsive to each of the task commands, the processing commands being at a higher level than the respective task commands;
a second control device fabricated on the integrated circuit substrate, the second control device being coupled to receive the memory commands from the first control device, the second control device being operable to generate a respective set of the memory device instructions responsive to each of the memory commands; and
a third control device fabricated on the integrated substrate, the third control device being coupled to receive the processing commands from the first control device, the third control device being operable to generate a respective set of the processing element instructions respective to each of the processing commands.

* * * * *